US012241297B2

(12) United States Patent
Fries

(10) Patent No.: US 12,241,297 B2
(45) Date of Patent: Mar. 4, 2025

(54) ITEM OF FURNITURE, IN PARTICULAR A CABINET

(71) Applicant: Steelcase Inc., Grand Rapids, MI (US)

(72) Inventor: Florian Fries, Munich (DE)

(73) Assignee: Steelcase Inc., Grand Rapids, MI (US)

( * ) Notice: Subject to any disclaimer, the term of this patent is extended or adjusted under 35 U.S.C. 154(b) by 95 days.

(21) Appl. No.: 17/759,661

(22) PCT Filed: Feb. 14, 2020

(86) PCT No.: PCT/IB2020/000038
§ 371 (c)(1),
(2) Date: Jul. 28, 2022

(87) PCT Pub. No.: WO2021/161056
PCT Pub. Date: Aug. 19, 2021

(65) Prior Publication Data

US 2023/0061256 A1 Mar. 2, 2023

(51) Int. Cl.
*A47B 55/00* (2006.01)
*E05B 65/44* (2006.01)
*E05D 15/58* (2006.01)

(52) U.S. Cl.
CPC ............ *E05D 15/581* (2013.01); *A47B 55/00* (2013.01); *E05B 65/44* (2013.01); *E05Y 2201/684* (2013.01); *E05Y 2900/212* (2013.01)

(58) Field of Classification Search
CPC ....... A47B 55/00; E05D 15/581; E05B 65/44; E05Y 2201/684; E05Y 2900/212
(Continued)

(56) References Cited

U.S. PATENT DOCUMENTS 3,716,282 A * 2/1973 Propst .................... A47B 67/04 312/334.44
3,794,401 A * 2/1974 Dean .................... A47B 46/005 312/331

(Continued)

FOREIGN PATENT DOCUMENTS

DE 203 07 207 U1 10/2004
DE 10 2011 109 552 A1 2/2013

(Continued)

OTHER PUBLICATIONS

European Patent Office; International Search Report; Oct. 15, 2020; entire document; Netherlands.

*Primary Examiner* — James O Hansen
(74) *Attorney, Agent, or Firm* — Price Heneveld LLP

(57) ABSTRACT

An item of furniture includes a first and a second side wall, a rear wall, a base arrangement, and a cover arrangement which delimit a receiving space. An opening is located between the first and the second side wall and in a closed position is closable by a closure flap that includes a first and a second guide device. A first and a second suspension frame are arranged on an upper end face of the first and second side wall, respectively, and point in a direction of the cover arrangement. The first and second guide device are arranged in a region of a first and second side, respectively, of the closure flap and are in mechanical contact with the first and second suspension frame, respectively, over the entire movement path of the closure flap from the open position into the closed position.

20 Claims, 13 Drawing Sheets

(58) Field of Classification Search
USPC ...................................... 312/139.1, 322, 323
See application file for complete search history.

(56) References Cited

U.S. PATENT DOCUMENTS

| | | | | | |
|---|---|---|---|---|---|
| 4,591,214 | A | | 5/1986 | Reuter et al. | |
| 4,615,570 | A | * | 10/1986 | Goodman | E06B 3/5045 312/331 |
| 4,703,980 | A | | 11/1987 | Schäfer | |
| 5,050,944 | A | * | 9/1991 | Fricano | A47B 81/00 49/260 |
| 5,104,080 | A | * | 4/1992 | Berger | A47J 37/0786 211/90.01 |
| 5,893,616 | A | * | 4/1999 | MacDonald | E06B 3/5045 312/265.5 |

FOREIGN PATENT DOCUMENTS

| | | | |
|---|---|---|---|
| EP | 1528212 | A1 | 5/2005 |
| EP | 2131125 | B1 | 7/2018 |
| WO | 9851194 | A1 | 11/1998 |

* cited by examiner 40, 41

ITEM OF FURNITURE, IN PARTICULAR A CABINET

BACKGROUND OF THE INVENTION

The invention relates to an item of furniture, in particular in the form of a cabinet.

Items of furniture, in particular in the form of a (lockable) cabinet, are used to store objects. A frequent problem is the selection of the items of furniture. Buyers often have the problem that the purchased item of furniture does not meet all the requirements or that the requirements change over time. Retrofitting solutions for items of furniture to expand functionality often do not exist. As a result, a new item of furniture has to be bought and the old item of furniture usually has no other use. The present invention attempts to retrofit an item of furniture in the form of a cabinet with an appropriate closure flap in order to safely store objects inside the cabinet.

There is a multiplicity of lockable cabinets in the prior art, all of which, however, have the disadvantage that the side walls have to be prepared during production to receive a corresponding guide system of a closure flap. For example, grooves are often cut in directly and bolts of the closure flap are later guided in said grooves. A subsequent introduction of these grooves is not possible. It is also not very aesthetically pleasing to use such a cabinet without a closure flap because the grooves are visible.

From DE 10 2011 109 552 B4, a hardware system is known which is pressed into a side wall of a cabinet. The hardware system then provides corresponding guide grooves in which guide pins of the closure flap can be guided. The same applies to EP 2 131 125 B1 which also requires the introduction of corresponding grooves. A similarly complicated structure can also be found in EP 1 528 212 B1. The same applies to DE 203 07 207 U1 which also provides for the elaborate use of a rail system for guiding corresponding pins of the closure flap. DE 202 09 103 U1 also describes a very complicated guide system for a closure flap on a cabinet.

A disadvantage of the prior art mentioned is therefore that the closure flaps shown cannot be retrofitted into a cabinet system.

Therefore, the problem addressed by the present invention is that of providing an item of furniture, in particular in the form of a cabinet, which allows retrofitting with a closure flap in the simplest possible manner.

SUMMARY OF THE INVENTION

The item of furniture, which is in particular a cabinet or cabinet system, comprises a first side wall, a second side wall, a rear wall, a base arrangement, and a cover arrangement. These elements delimit a receiving space. A first and second side wall could also be referred to as a left and right side wall. An opening is formed between the first and the second side wall. Furthermore, a closure flap is provided which can be moved between an open position and a closed position. In the open position, the receiving space of the item of furniture is accessible via the opening. In the closed position of the closure flap, the opening is closed by the closure flap. The closure flap comprises a first and a second guide device. Furthermore, a first and a second suspension frame are provided. The first suspension frame rests on an upper end face of the first side wall. The upper end face points in the direction of the cover arrangement. The second suspension frame rests on an upper end face of the second side wall and also points in the direction of the cover arrangement. The first guide device is arranged in the region of a first side of the closure flap and is in mechanical contact with the first suspension frame over the entire movement path of the closure flap, i.e., from the open position into the closed position. The same also applies to the second guide device. This second guide device is arranged in the region of a second side of the closure flap. The second side of the closure flap is opposite the first side of the closure flap. The second guide device is also in mechanical contact with the second suspension frame over the entire movement path of the closure flap, i.e., from the open position into the closed position. The wording "mechanical contact" means that the closure flap is held and/or guided on the respective first and second suspension frame via the respective first or second guide device over its entire movement path.

It is particularly advantageous that a suspension frame is used which is very easily placed on the upper end face of the respective first or second side wall. There is no other mechanical preparation of the respective first or second side wall required for said side walls to be able to interact with a corresponding closure flap.

It is therefore very easy to retrofit a cabinet. Only the closure flap has to be purchased together with the first and second suspension frame, respectively. The suspension frames are simply placed on or suspended from the respective first or second side wall and are immediately used to hold or guide the closure flap.

Such retrofitting is not possible in the prior art in which extensive processing of the side walls must be carried out. Reversing these modifications is not possible in the prior art.

In a preferred development, the first and/or the second suspension frame comprises a support portion that rests on the upper end face of the respective first or second side wall. This support portion preferably rests on the end face along the majority of its length. The support portion is preferably continuous. However, the support portion could also comprise one or more support segments, wherein a plurality of support segments is separated from one another, so that the support portion does not run continuously, i.e., not without interruption. The support portion could optionally also overlap the respective end face and extend along an outer side of the respective first or second side wall. The respective first and/or second suspension frame also comprises a contact portion. The contact portion extends from the respective support portion in the direction of the base arrangement and ends at a distance from said base arrangement within the receiving space. The contact portion bears against an inner side of the first or second side wall. The side wall is free of corresponding engagement openings into which the contact portion dips. The first and/or the second suspension frame also comprises an engagement device which is arranged on the contact portion in the region of the opening. In particular, this engagement device is arranged less than 5 cm, 4 cm, 3 cm or less than 2 cm from the opening. The engagement device extends into the receiving space. An angle between the engagement device and the contact portion is preferably 90°. Deviations therefrom are permissible. However, they should preferably be less than 20°, 15°, 10° or less than 5°. Furthermore, the engagement device is designed to engage in the first or second guide device of the closure flap. This creates the mechanical contact (e.g., holding and/or guiding).

The engagement device is preferably a cylindrical projection or a peg. A peg can have a cross-sectional shape that deviates from a round cross-sectional shape (cylindrical projection). This can also be an engagement pin.

In a further embodiment, the first and/or second suspension frame comprise a support member. This support member is formed on the respective contact portion (preferably in one piece) and extends in the direction of the receiving space. The support member forms an angle of approximately 90° towards the contact portion. Deviations therefrom are possible (preferably less than 20°, 15°, 10°, 5°. The support member preferably extends by less than 5 cm, 4 cm, 3 cm or by less than 2 cm into the receiving space. It preferably extends more than 0.5 cm or 1 cm into the receiving space. The support member is designed to hold the closure flap in the open position in the region of the first or second side.

The support member preferably runs in a plane that is parallel to the base arrangement. The support member could also be inclined. With respect to its extending towards the rear wall, it would preferably be inclined in the direction of the base arrangement. The support member is preferably designed without interruption. However, it could also have interruptions. The thickness of the support member is preferably constant. However, it could also vary along its length.

In a further embodiment, the support member of the first and/or second suspension frame is spaced farther apart from the cover arrangement than the engagement device. The closure flap therefore rests on the support member. The inner side of the closure flap could rest directly on the support member. However, it could also rest with its first or second guide device on the support member of the first or second suspension frame.

In a further embodiment, the respective support member of the first or second suspension frame is arranged further spaced apart from the opening of the item of furniture than the engagement device of the first or second suspension frame. As a result, the closure flap can be closed particularly easily because it does not get caught on the support member during the rotary movement (from the open position into the closed position and back).

In another embodiment, the respective support member of the first or second suspension frame comprises a stop portion. This stop portion is arranged at the end of the respective support member that points more closely in the direction of the rear wall. The stop portion runs from the respective support member in the direction of the cover arrangement (and preferably ends spaced apart from the cover arrangement). The stop portion further preferably runs at an angle of 90° towards the support member. Deviations therefrom are possible (preferably less than 20°, 15°, 10°, 5°. This stop portion is used to position the first or second suspension frame in the item of furniture. As soon as the first or second suspension frame is correctly positioned, the stop portion bears against an inner side of the rear wall.

In a further embodiment, the respective support member of the first or second suspension frame extends over more than 50%, 60% or over more than 70%, but preferably over less than 95%, 90%, 85% or over less than 80% of the length of the first or second suspension frame. This ensures that the closure flap is held stably whilst the closing movement or opening movement is not blocked by the respective support member.

In order to ensure that the first or second suspension frame is held as stably as possible on the first or second side wall, the first and/or second suspension frame preferably also comprise a front contacting portion. The front contacting portion encompasses the front end face of the first or second side wall and bears against this front end face. Additionally or alternatively, the first and second suspension frame, respectively, comprise a rear contacting portion. Over a partial length of the left or right end face of the rear wall, this rear contacting portion bears precisely against said left or right end face. The respective rear contacting portion runs vertically (downwards), i.e., in the direction of the base arrangement. This ensures that the first and second suspension frame, respectively, are held in position.

In a further embodiment, an additional fastening solution of the first and the second supporting frame is described. It is proposed that at least one support rod (preferably two support rods) be provided. The at least one support rod is fastened to the first and to the second suspension frame, so that these suspension frames support one another and cannot fall into the receiving space. The at least one support rod is preferably arranged on the contact portion of the first suspension frame and on the contact portion of the second suspension frame. As a result, both contact portions are pressed in the direction of the inner side of the respective first or second side wall. The at least one support rod extends between the cover arrangement and the closure flap when the closure flap is in the open position.

In a further embodiment, the fastening of the support rod is explained in more detail. The contact portion of the first or second suspension frame comprises a holding device. The holding device comprises a wall that is continuous at least in portions, extends in the direction of the receiving space and surrounds a holding space. This holding space is open at least in the direction of the respectively opposite suspension frame, so that a first or second end of the support rod is arranged in this holding space and held by the continuous wall. The continuous wall can be designed to be slotted, so that the individual wall segments have resilient or elastic properties. It can also be open in a further direction (preferably perpendicular to the longitudinal axis of the support rod), wherein the support rod can be removed via this further opening. An angle between the holding device and the contact portion is preferably 90°. The support rod is preferably made of plastic. It could also be made of a metal. Furthermore, it preferably has a round cross section. Deviating cross-sectional shapes (e.g., triangular, square, polygonal, oval, etc.) are possible.

In a further embodiment, the first and the second suspension frame, respectively, are constructed in one piece. The first and second suspension frame, respectively, preferably comprise or consist of plastic. For example, they can be produced in a plastic injection moulding process.

In a further embodiment, the first and the second support frame could also be integral with one another. In this case, the first and the second support frame could be connected to one another via one or more connecting webs. The one or more connecting webs would then take over the function of the at least one support rod. The connecting webs would preferably run directly below, or bear against, the cover arrangement.

In a further embodiment, the first and the second suspension frame, respectively, are mounted in a screw-free and/or non-adhesive and/or press-free manner on the first and second side wall. Additionally and alternatively, it is possible that the first or second suspension frame can be removed again from the first or second side wall without leaving any traces because no processing of the respective first or second side wall is necessary.

For this reason, the first or second side wall is in particular free of a groove for guiding the closure flap or for fastening the first or second side frame.

In a further embodiment, the first or second guide device comprises a guide groove. In the open position of the closure flap, this guide groove is open in the direction of the first or second side wall and designed to accommodate the engagement device of the first or second suspension frame.

In a further embodiment, the guide groove of the first or second guide device is arranged in a first or second (lateral) end face of the closure flap. This groove can be created by a milling process. A corresponding metal fitting, which comprises the groove, could also be pressed into the end face. However, before pressing it in, a corresponding recess should preferably be created. Such a fitting, which in particular consists of metal or comprises metal, could also be glued in place. The fitting could also consist of plastic. Alternatively, the guide groove of the first or second guide device could be arranged in a separate first or second housing arrangement. This first or second housing arrangement is in this case fastened to an inner side of the closure flap (in the region of its left or right side). Such a fastening can take place, for example, by means of an adhesive connection or a screw connection. A clip connection would also be possible.

A further embodiment describes that the guide groove of the first or second guide device runs exclusively along a straight line. Curved profiles should be avoided. Such a straight profile applies in particular to the portions of the guide groove in which the engagement device of the first or second suspension frame is located during a movement of the closure flap from the open position into the closed position and back.

In a further embodiment, the guide groove of the first or second guide device comprises two closed ends. In the closed position of the closure flap, the guide groove of the first or second guide device is closed in the direction of the cover arrangement or the base arrangement. This prevents the engagement device of the first or second suspension frame from disengaging from the respective first or second guide device.

A further embodiment describes that the first or second guide device has an insertion opening via which the respective guide groove is accessible. The insertion opening is preferably arranged at 90° to the (regular) opening of the guide groove, via which the engagement device engages in the groove. In the open position of the closure flap or shortly before reaching the open position of the closure flap, this additional insertion opening faces in the direction of the base arrangement. The engagement device of the first or second suspension frame can be inserted into the respective guide groove via this insertion opening.

In principle, it would be possible for the engagement device to have a widened portion at its free end, and for the respective guide groove to have an opening width over its length such that the widened portion of the engagement device cannot be removed. It would only be possible to remove it from the guide groove in the region of the insertion opening.

A further embodiment describes that the insertion opening of the first guide device and the insertion opening of the second guide device are arranged at different distances from the rear wall in the open position of the closure flap. As a result, an unintentional removal of the closure flap in its entirety is prevented because this would require the respective engagement devices of the first or second suspension frame to jump out of their respective guide groove at different points in time during the opening movement.

The insertion opening of the first or second guide device is preferably located at the end of the respective guide groove at which the engagement device is arranged when the closure flap is almost completely (but preferably not completely) open. This prevents the engagement device from accidentally jumping out of the first or second guide device (and thus the respective guide groove) during the closing process, i.e., when the closure flap is rotated.

A preferred embodiment also describes the use of a first and/or second doorstop. The first doorstop is arranged in the region of the first side wall and the base arrangement, and the second doorstop is arranged in the region of the second side wall and the base arrangement. In particular, the first and the second doorstop are each arranged in the transition between their respective side wall and the base arrangement. The first and the second doorstop, respectively, comprise a stop portion having a flap stop surface. This flap stop surface is arranged in the region of the opening of the item of furniture (preferably less than 5 cm, 4 cm, 3 cm, 2 cm, 1 cm but preferably more than 0.5 cm from the opening). In the closed position, the closure flap can be brought into contact with the flap stop surface of the first or second doorstop. This prevents the closure flap from rotating further into the receiving space and from assuming an angle of approximately 90° to the base arrangement in the closed position.

A further embodiment describes that the first and the second doorstop, respectively, comprise a resting surface. The resting surface is introduced between the first or second side wall and the base arrangement. This means that the first or second side wall rests on said resting surface. The first and the second doorstop also comprise a contact portion. Proceeding from the resting surface, the contact portion extends in the direction of the cover arrangement and ends at a distance from said cover arrangement. Within the receiving space, the contact portion of the first or second doorstop bears against an inner side of the first or second side wall.

The stop portion of the first or second doorstop is arranged on the contact portion in the region of the opening and extends in the direction of the receiving space. The stop portion preferably forms an angle of 90° to the contact portion.

In order to ensure that the first and second doorstops are held in position in a positionally immobile manner in the region of their respective first and second side wall and the base arrangement, the first and the second doorstop preferably comprise a front contacting portion. The front contacting portion encompasses the front end face of the first or second side wall and bears against the front end face over a partial length. Additionally or alternatively, the first and the second doorstop, respectively, comprises a rear contacting portion. The rear contacting portion preferably runs vertically (from the base arrangement in the direction of the cover arrangement). Over a partial length of the left or right end face of the rear wall, the rear contacting portion bears precisely against this left or right end face.

In a further embodiment, the first and the second doorstop are constructed in one piece. The first and the second doorstop preferably comprise or consist of plastic. For example, they can be produced in a plastic injection moulding process.

In a further embodiment, the first and the second doorstop could also be integral with one another. In this case, the first and the second doorstop could be connected to one another via one or more connecting webs. As a result, they could also support one another. The connecting webs would preferably rest on the base arrangement, wherein, e.g., a shelf could be arranged above it.

A further embodiment describes that the closure flap has a lock device. The lock device can assume a closed state or an open state. In the closed state, the closure flap cannot be opened in the closed position. The lock device may comprise a lock which can be opened with a key. A combination lock or a radio lock (e.g., RFID) may also be used.

A further embodiment describes that the lock device comprises a closure rod arrangement. In the closed state, the closure rod arrangement can be brought into engagement with a lock stop surface of the first and/or second doorstop. The lock stop surface of the first and/or second doorstop points in the direction of the rear wall, so that the closure flap cannot be opened (rotating the closure flap) because the closure rod arrangement then strikes the lock stop surface. It would also be possible for the lock stop surface to be formed by an opening in the contact portion of the first or second doorstop. In particular, this opening would be introduced into a corresponding projection.

This lock stop surface of the first or second doorstop can be formed by the stop portion of the first or second doorstop, which also has the flap stop surface. However, the lock stop surface can also be formed by a further stop portion which is arranged closer to the rear wall than the stop portion with the flap stop surface.

In the closed state, preferably neither the rear wall nor the left and right side wall or the closure flap can be removed. In particular, this is because all elements in this state block each other when it comes to the removal. In particular, the first and second side wall and the rear wall can only be removed by pressing, folding or tilting them into the receiving space. However, the rear wall is prevented from being folded or pressed or tilted in by the first and second suspension frames and optionally by the first and the second doorstop. The folding in or pressing in or tilting in of the first and second side wall is prevented in particular by the at least one support rod. The first and second guiding device of the closure flap can only be freed from the engagement device of the respective first or second suspension frame in a specific position. In the closed state, this position is precisely not reached, in particular, because the closure rod arrangement additionally counteracts such a removal.

In a further embodiment, the item of furniture also comprises a first front and a first rear vertically extending column and a second front and a second rear vertically extending column. The first side wall is then arranged between the first front and the first rear column.

The second side wall is arranged between the second front and second rear column. The rear wall is arranged between the first rear and second rear column. The opening is then located between the first and second front column. Preferably, the columns comprise a square cross section. The first front and first rear vertically extending column is preferably aligned such that the side surfaces of the respective vertically extending column are aligned at 45° to the side surfaces (outer side, inner side) of the first side wall and the rear wall. The same also applies to the second front and the second rear vertically extending column. These are preferably also aligned such that the side surfaces of the second front and second rear vertically extending column are aligned at 45° to the side surfaces (inner side, outer side) of the second side wall and the rear wall.

In principle, it would also be possible to provide columns that have a completely different alignment and cross-sectional shape.

A further embodiment describes in this case the fastening of the rear wall. The rear wall can be fastened without screws and without adhesive. For example, the rear wall comprises a receiving slot at each corner (four corners), which, proceeding from the respective corner, extends into the two adjacent end faces. A holding element is arranged (inserted) in each corner and preferably designed in one piece. The holding element comprises two holding surfaces protruding, i.e., projecting, from the end face. The holding surfaces of each holding element extend parallel but in different planes to one another. A first holding member bears with its first holding surface against the side surface of the first rear column which points in the direction of the receiving space (because it is rotated by 45°). The first holding element bears with its second holding surface against an outer side of the cover arrangement. By contrast, the second holding element bears with its first holding surface against the side surface of the first rear column which points in the direction of the receiving space. The second holding element bears with its second holding surface against an outer side of the base arrangement. By contrast, the third holding element bears with its first holding surface against the side surface of the second rear column which points in the direction of the receiving space. The third holding element bears with its second holding surface against an outer side of the cover arrangement. The fourth holding element bears with its first holding surface against the side surface of the second rear column which points in the direction of the receiving space. The fourth holding element bears with its second holding surface against an outer side of the base arrangement. The outer sides are visible from outside the item of furniture. As a result, the rear wall can be inserted very easily. It is introduced at an angle into the receiving space of the item of furniture, so that the second and the fourth holding element come into position in order to then be aligned to be straight. The first and the third holding element subsequently also come into engagement with the respective column and the side surface of the cover arrangement. The holding elements ensure that the rear wall centres itself. Corresponding holding elements could also be introduced into the corners of the respective first and second side wall. The holding elements of the first side wall then come into contact with the cover arrangement, the base arrangement, and the first front and the first rear column. The holding elements of the second side wall then come into contact with the cover arrangement, the base arrangement, and the second front and the second rear column. In this case, the respective first or second suspension frame does not cover the corner region of the first or second side wall.

A cover arrangement preferably comprises all structures above the respective side wall or rear wall. It can be a wooden insert which is, for example, surrounded by a holding device, e.g., made of metal. The same can also apply to the base arrangement. The cover arrangement and the base arrangement do not have to be, but can be, made in one piece. Both the base arrangement and the cover arrangement can also consist of a single (wooden) panel. In addition to a pedestal, the base arrangement can also comprise a corresponding shelf.

BRIEF DESCRIPTION OF THE DRAWINGS

Different embodiments of the invention are described in the following by way of example with reference to the drawings. The same objects have the same reference signs. The corresponding figures of the drawings show in detail in.

DETAILED DESCRIPTION OF THE PREFERRED EMBODIMENTS

Figure 1:
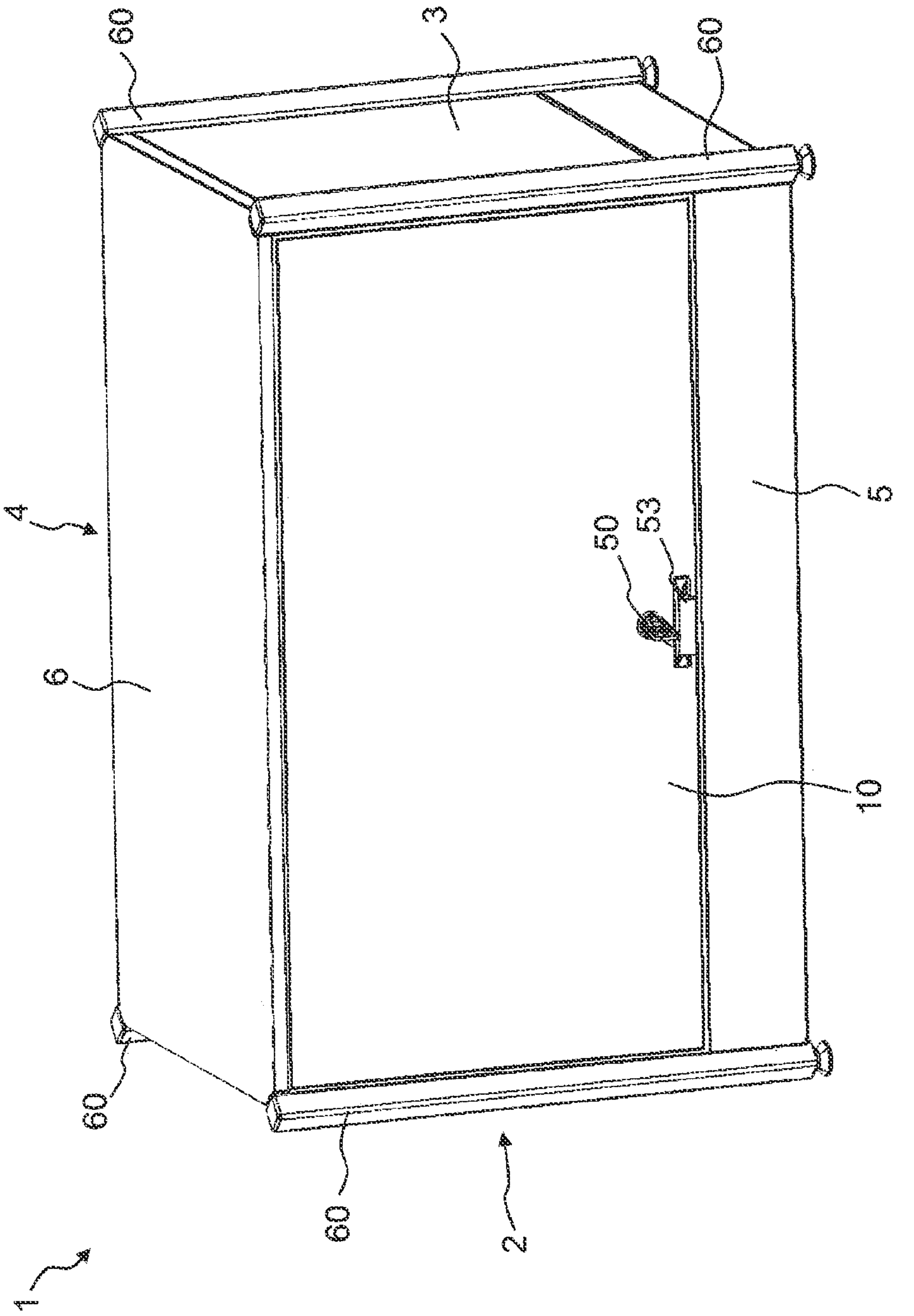
FIGS. 1 and 2 are the item of furniture according to the invention in the form of a cabinet with a closed and open closure flap.
Figure 2:
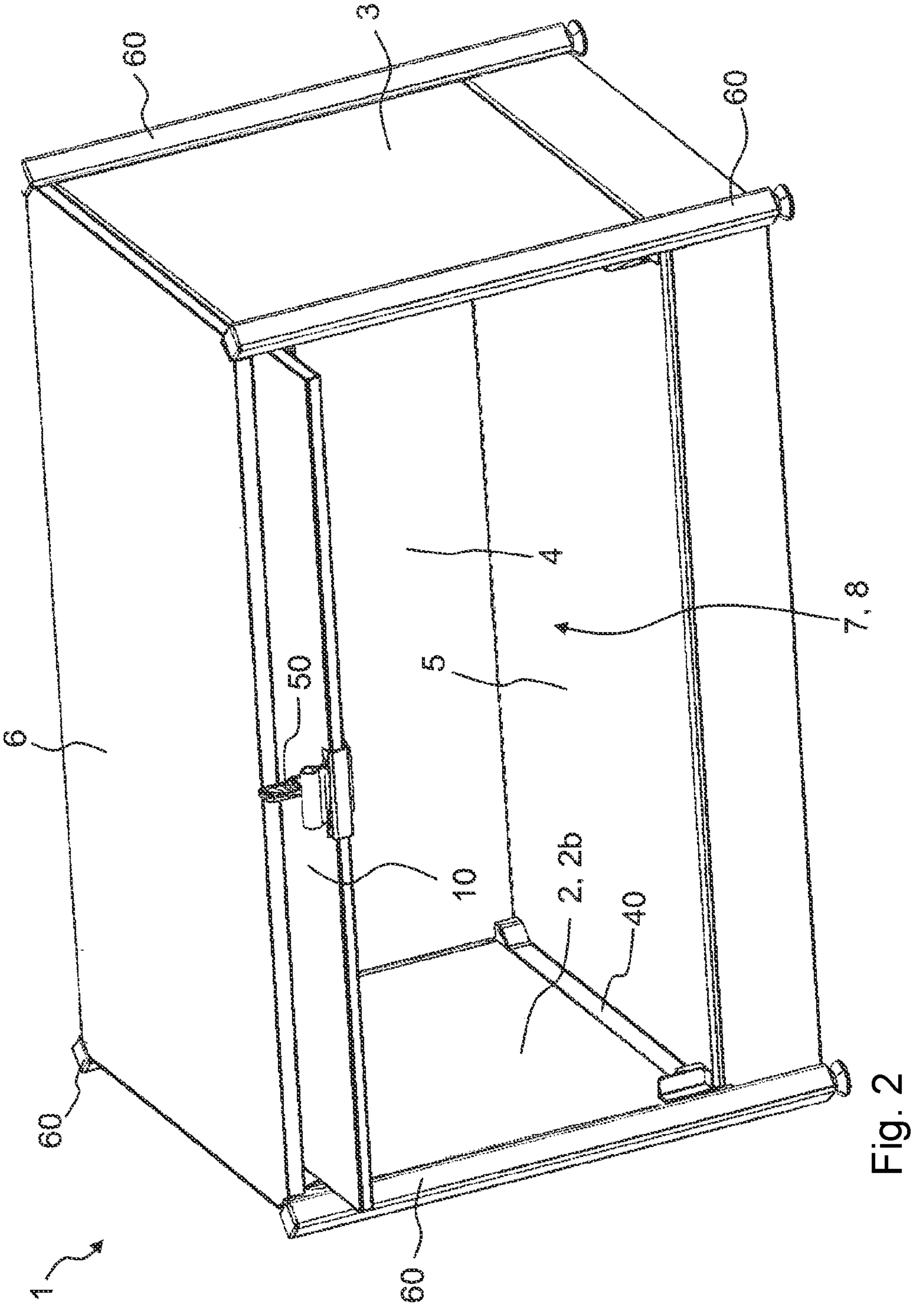

FIGS. 1 and 2 show the item of furniture 1 according to the invention. In the embodiment, it is a free-standing cabinet. However, the item of furniture 1 could also be part of a shelving system. This includes, for example, a corresponding shelf. The item of furniture 1 comprises a first side wall 2 and a second side wall 3 as well as a rear wall 4, a base arrangement 5, and a cover arrangement 6. In the figures, the base arrangement 5 is shown without a corresponding shelf. These delimit a receiving space 8. An opening 7 is provided between the first and the second side wall 2, 3, via which the receiving space 8 is accessible. Furthermore, a closure flap 10 is provided, which is movable between an open position (FIG. 2), in which the receiving space 8 is accessible from outside the item of furniture 1, and a closed position (FIG. 1), in which the opening 7 is closed by the closure flap 10.

Figure 3A:
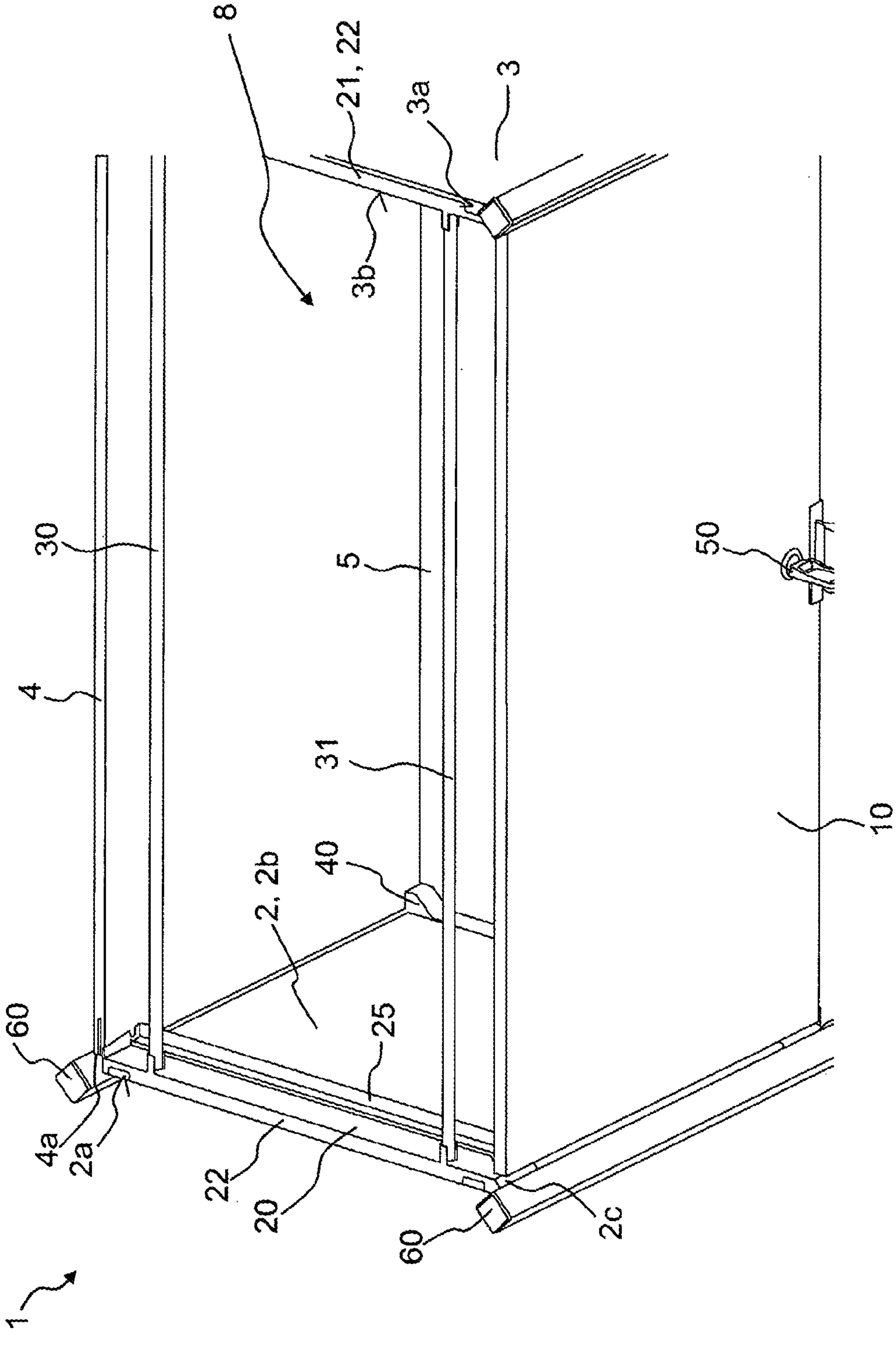
FIGS. 3A and 3B are different views of the item of furniture according to the invention with a removed cover arrangement.
Figure 3B:
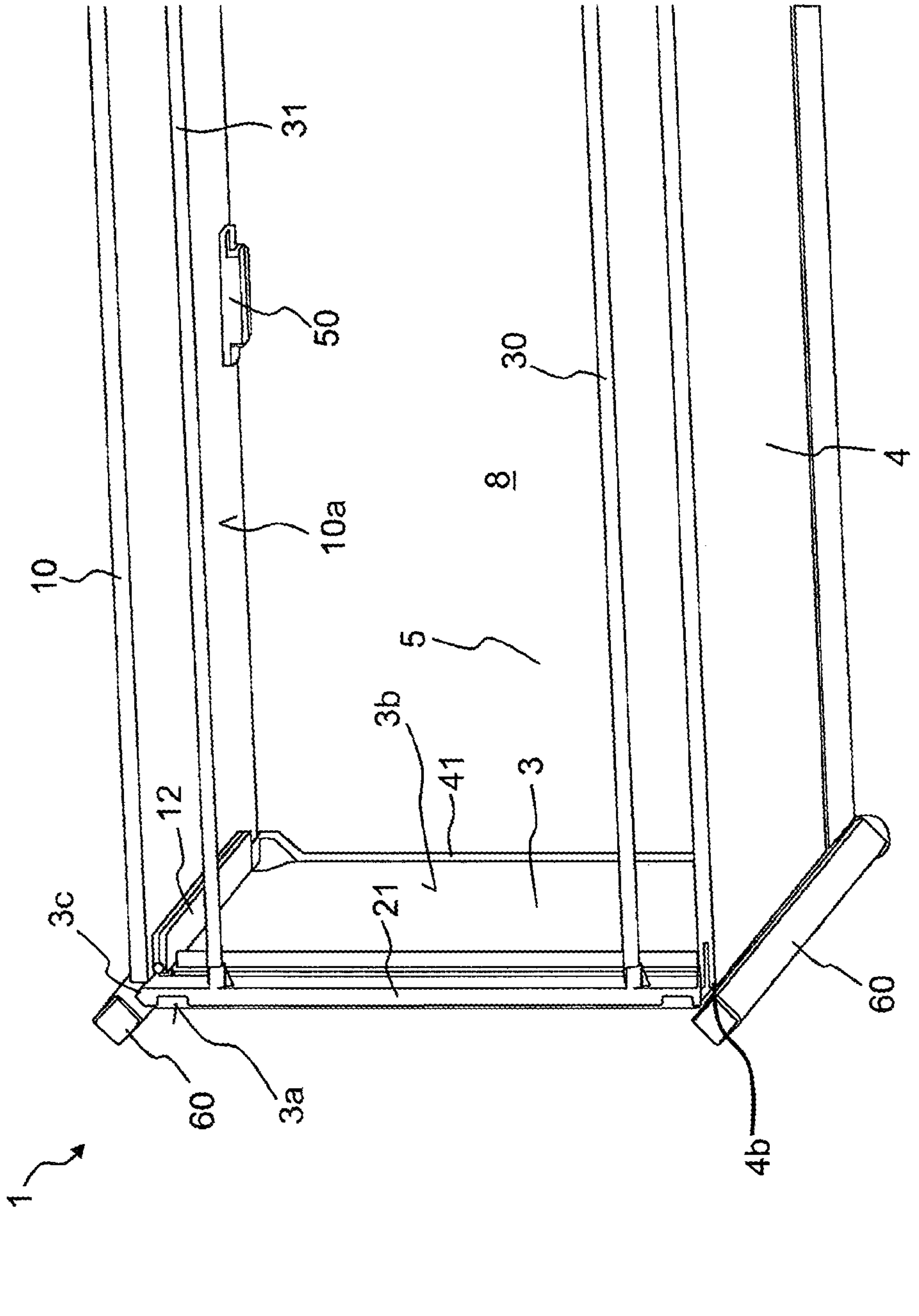

FIGS. 3A and 3B are further views of the item of furniture 1 with the cover arrangement 6 removed. They show a first suspension frame 20 and a second suspension frame 21.

The wording "first" can also be understood as "left" in a plan view of the opening 7. The wording "second" can also be understood as "right" in a plan view of the opening 7. The first suspension frame 20 rests on an upper end face 2*a* of the first side wall 2. This upper end face 2*a* extends in the direction of the cover arrangement 6. By contrast, the second suspension frame 21 rests on an upper end face 3*a* of the second side wall 3, which also points in the direction of the cover arrangement 6.

Figure 5:
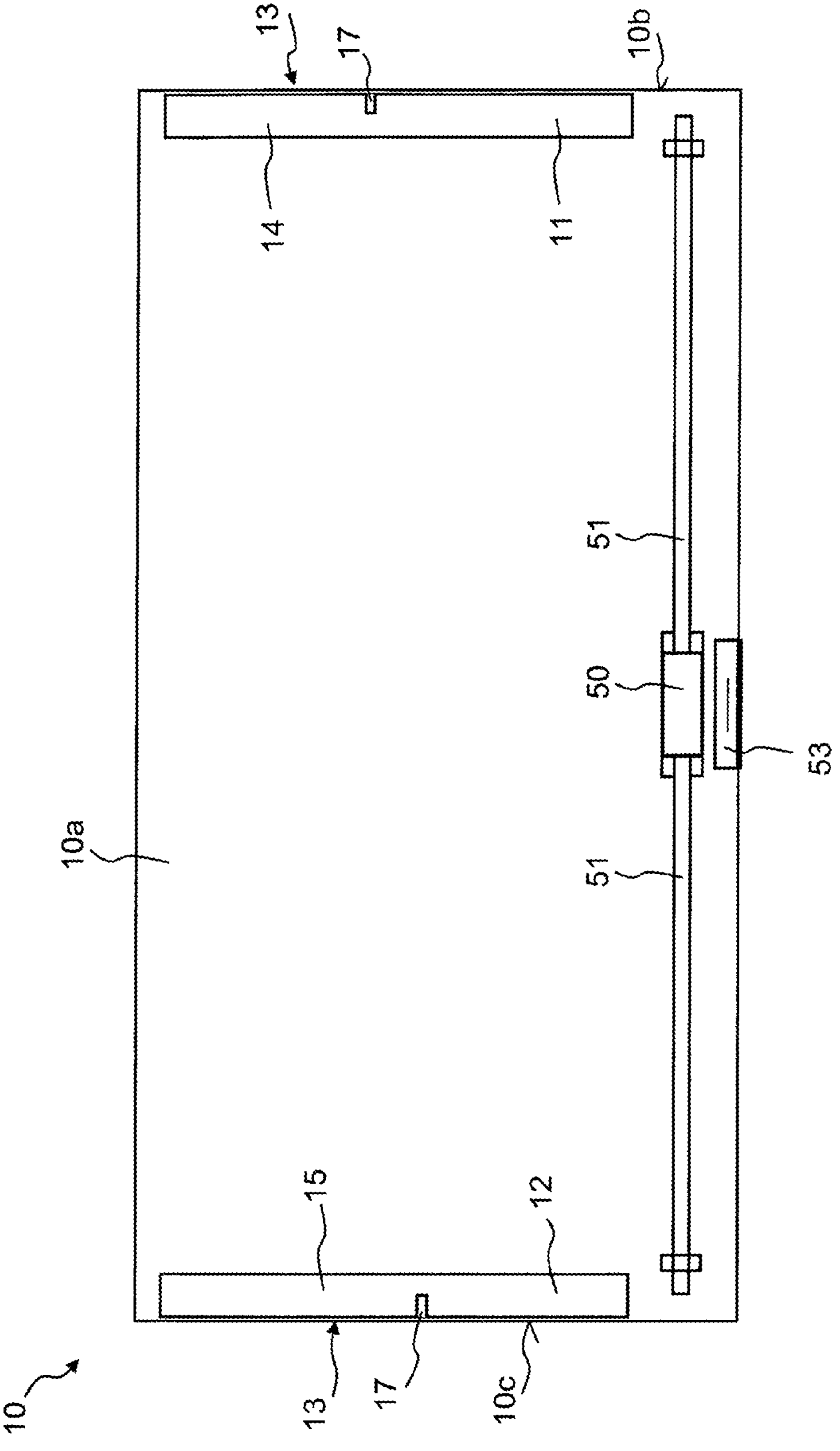
FIG. 5 is a plan view of an inner side of the closure flap.
Figures 6A, 6B:
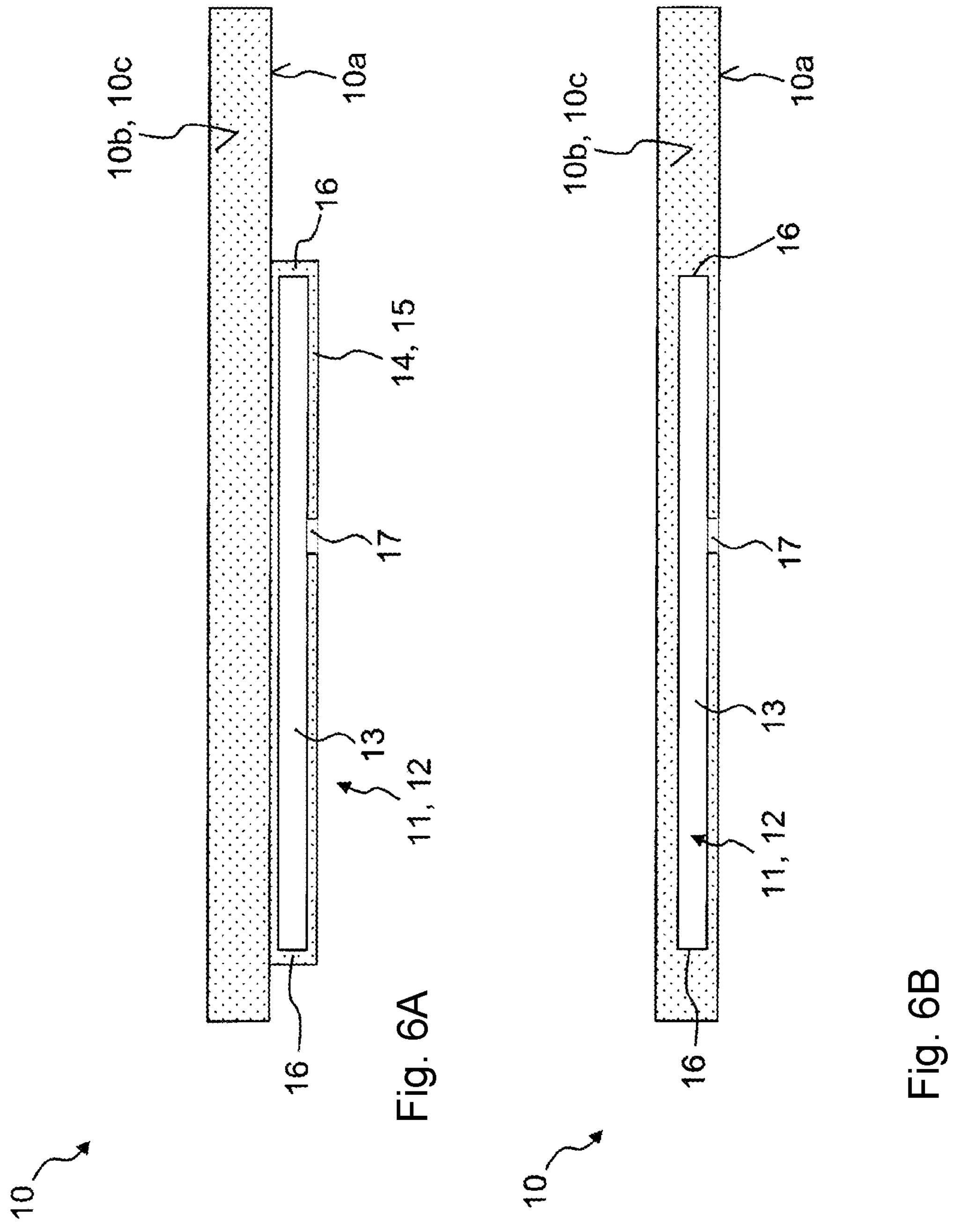
FIGS. 6A and 6B are different embodiments of a guide device of the closure flap.

In order to be able to open and close the closure flap 10, it comprises a first guide device 11 (see, e.g., FIG. 5) which is arranged in the region of a first side of the closure flap 10 and in mechanical contact with the first suspension frame 20 over the entire movement path of the closure flap 10. There is also a second guide device 12 which is arranged in the region of a second side of the closure flap 10 and in mechanical contact with the second suspension frame 21 over the entire movement path of the closure flap 10. The guide devices 11 and 12 are shown in particular in FIG. 5. FIGS. 6A and 6B show further embodiments of the first and second guide device 11, 12.

Figure 4A:
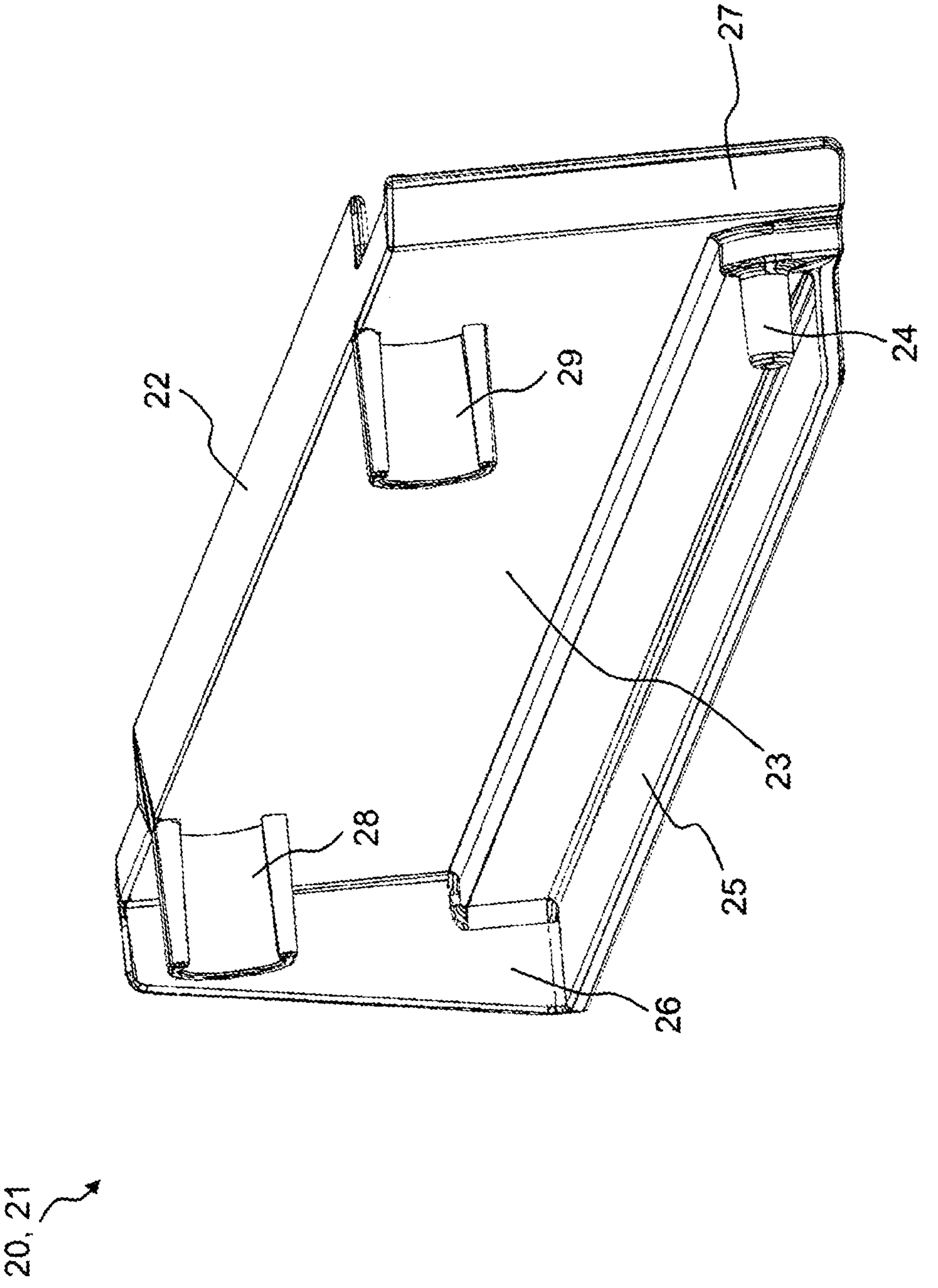
FIGS. 4A, 4B and 4C are different views of a suspension frame.
Figure 4B:
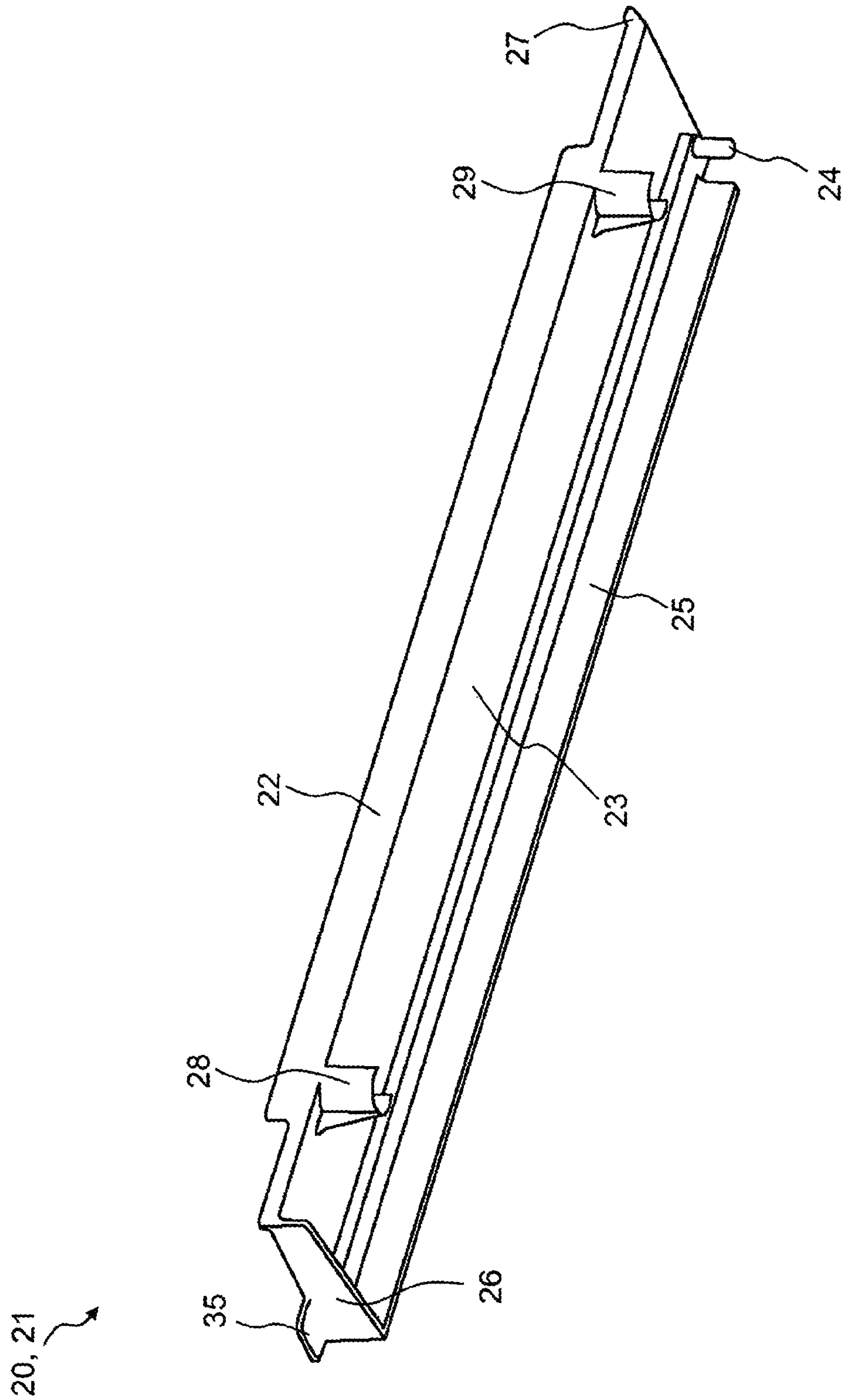
Figure 4C:
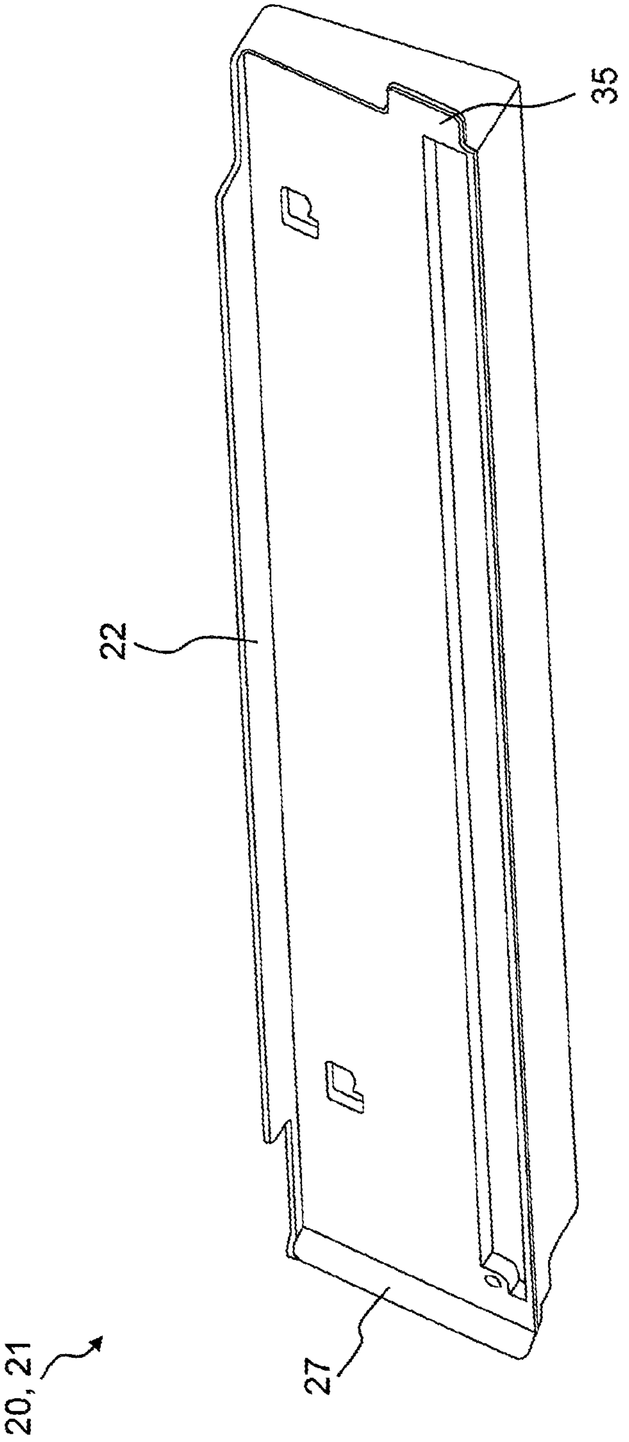

FIGS. 4A, 4B, and 4C describe the structure of the first and second suspension frame 20, 21. The figures show the second (right) suspension frame 21. The first suspension frame 20 comprises a corresponding mirrored structure. The reference signs for the individual parts of the second suspension frame 21 are identical to those of the first suspension frame 20. Therefore, the same reference signs are used.

The first and second suspension frame 20, 21 comprise a support portion 22 which rests on the respective upper end face 2*a*, 3*a* of the first and second side wall 2, 3, respectively. There is also a contact portion 23 which, proceeding from the support portion 22, extends in the direction of the base arrangement 5 (e.g., by preferably less than 8 cm, 7 cm, 6 cm, 5 cm or less than 4 cm) and ends spaced apart therefrom. The contact portion 23 runs on an inner side 2*b* or 3*b* of the first or second side wall 2, 3. Furthermore, an engagement device 24 is provided, which is arranged on the contact portion 23 in the region of the opening 7 and extends in the direction of the receiving space 8. This engagement device 24 is designed to engage in the respective first or second guide device 11, 12 of the closure flap 10.

The engagement device 24 of the first or second suspension frame 20, 21 is, for example, in the form of a pin. For example, this can be a cylindrical projection or a peg. The free end of this engagement device 24 can be widened in relation to an intermediate piece. The engagement device 24 preferably also widens in the direction of the contact portion 23. As a result, the robustness of the engagement device 24 is increased and there is an optimal force transfer.

The first and second suspension frames 20, 21 also comprise a support member 25 which is (in particular integrally) formed on the contact portion 23 and extends in the direction of the receiving space 8. The support member 25 is preferably arranged on the region of the first or second suspension frame 20, 21, which is arranged closest to the base arrangement 5. The support member 25 is designed to hold the closure flap 10 in the open position in the region of its first or second side. This also makes it easier to guide.

The support member 25 is spaced further apart from the cover arrangement 6 than the engagement device 24. The engagement device 24 can be attached to one end of the support member 25 which is arranged in particular in the region of the opening 7.

The engagement device 24 preferably protrudes into the receiving space 8 to the same extent as the support member 25. The engagement device 24 could also protrude further or less far into the receiving space 8 than the support member 25.

The support member 25 of the first or second suspension frame 20, 21 preferably comprises a stop portion 26. This stop portion 26 extends from the support member 25 in the direction of the cover arrangement 6 or the support portion 22. In the open position, the closure flap 10 could preferably be brought into contact with said stop portion 26. Preferably, however, the closure flap 10 cannot be brought into contact with said stop portion 26. Instead, the stop portion 26 is used to position the first or second suspension frame 20, 21 in the cabinet. The stop portion 26 thus bears against an inner side of the rear wall 4 and is used as a stop for the first or second suspension frame 20, 21 during the positioning on the respective first or second side wall 2, 3.

The first and the second suspension frame 20, 21 comprise a front contacting portion 27. The front contacting portion 27 can be brought into contact with, or bears against, a front end face 2*c*, 3*c* of the first or second side wall over a partial length of said front end face. The front contacting portion 27 can also be supported on the first or second front vertical column 60.

The first or second suspension frame 20, 21 also comprises a rear contacting portion 35 (see FIG. 4B) which, over a partial length of the left end face 4*a* or the right end face 4*b* of the rear wall 4, bears precisely against those end faces 4*a*, 4*b*.

In order to prevent the first and the second suspension frame 20, 21 from falling into the receiving space 8, at least one support rod 30, 31 is preferably also provided. In FIG. 3A, two support rods 30, 31 are provided which run parallel to one another. The at least one support rod 30, 31 is arranged on the contact portion 23 of the first or second suspension frame 20, 21 and extends between the cover arrangement 6 and the closure flap 10 when the latter is in the open position.

The contact portion 23 of the first or second suspension frame 20, 21 comprises at least one holding device 28, 29. FIG. 4A shows two holding devices 28, 29 for two support rods 30, 31. The respective holding device 28, 29 comprises a wall that is continuous at least in portions. It extends in the direction of the receiving space 8. In this case, it delimits a corresponding holding space which is open at least in the direction of the respective other suspension frame 21, 20. One end of each of the support rods 30, 31 is arranged and held in the corresponding holding space.

The holding space can also be open on a further side (in particular perpendicular to the extension of the support rod 30, 31). This could result in a so-called clipping of the support rod 30, 31 into the holding device.

In the following, the first and second guide devices 11, 12 are described again with reference to FIGS. 5, 6A, and 6B, and their interaction with the respective engagement device 24 of the first and second suspension frame 20, 21 is explained. The first or second guide device 11, 12 comprises a guide groove 13. This guide groove 13 is open in the open position of the closure flap 10 in the direction of the first or second side wall 2, 3 and is designed to receive the respective engagement device 24 of the first or second suspension frame 20, 21.

FIG. 6A shows that the guide groove 13 is arranged in a respective first or second housing arrangement 14, 15. Such a first housing arrangement 14 and second housing arrangement 15 are shown in FIG. 5. They are preferably fastened (e.g., screwed and/or glued) to an inner side 10*a* of the closure flap 10.

By contrast, FIG. 6B shows that the guide groove 13 of the first or second guide device 11, 12 is arranged in, in particular introduced into, a first or second end face 10*b*, 10*c* of the closure flap 10. This guide groove 13 can, for example, be latched into the respective first or second end face 10*b*, 10*c*.

The housing arrangement 14, 15 preferably does not extend over the entire height of the closure flap 10. The housing arrangement 14, 15 preferably has a width of preferably less than 6 cm, 5 cm, 4 cm or less than 3 cm and a height (thickness) of preferably less than 3 cm, 2 cm and less than 1 cm.

The opening width of the guide groove 13 is matched to the engagement device 24 and is intended to ensure that the engagement device 24 slides back and forth. Preferably, the guide groove 13 has an opening width of less than 1 cm, 8 mm, 6 mm or less than 5 mm, but preferably of more than 2 mm.

The guide groove 13 preferably runs exclusively along a straight line in the region in which the engagement device 24 of the first or second suspension frame 20, 21 moves during the normal movement of the closure flap 10 from the open position into the closed position.

The ends 16 of the guide groove 13 of the first or second guide device 11, 12 are preferably closed and serve as end stops in the open or closed state of the closure flap 10. Elements such as screws could preferably also be inserted or screwed into the grooves in order to be able to set the end stop and thus the open position and the closed position.

When the closure flap 10 is installed, the distance between the left or right end face 10*b*, 10*c* of the closure flap 10 towards the respective contact portion 23 of the first or second suspension frame 20, 21 is smaller than the length of the engagement device 24 of the first or second suspension frame 20, 21. As a result, the engagement device 24 cannot be pulled off the closure flap 10 on the side of the end face.

For installing the closure flap 10, the first or second guide device 11, 12 comprises an insertion opening 17 via which the guide groove 13 is accessible. In the open position of the closure flap 10 or before this open position is reached (in a predominantly horizontal position of the closure flap 10), the insertion opening 17 faces in the direction of the base arrangement 5. By correspondingly raising the closure flap 10 into the suitable position, the engagement device 24 can be removed from the respective guide groove 13 via the insertion opening 17.

The insertion opening 17 of the first guide device 11 and the insertion opening 17 of the second guide device 12 are preferably at different distances from the upper or lower end face of the closure flap 10, so that the engagement device 24 cannot be accidentally released from both guide grooves 13 at the same time.

FIGS. 7A, 7B, 7C, and 7D show different states of the closure flap 10.

Figures 7A, 7B, 7C:
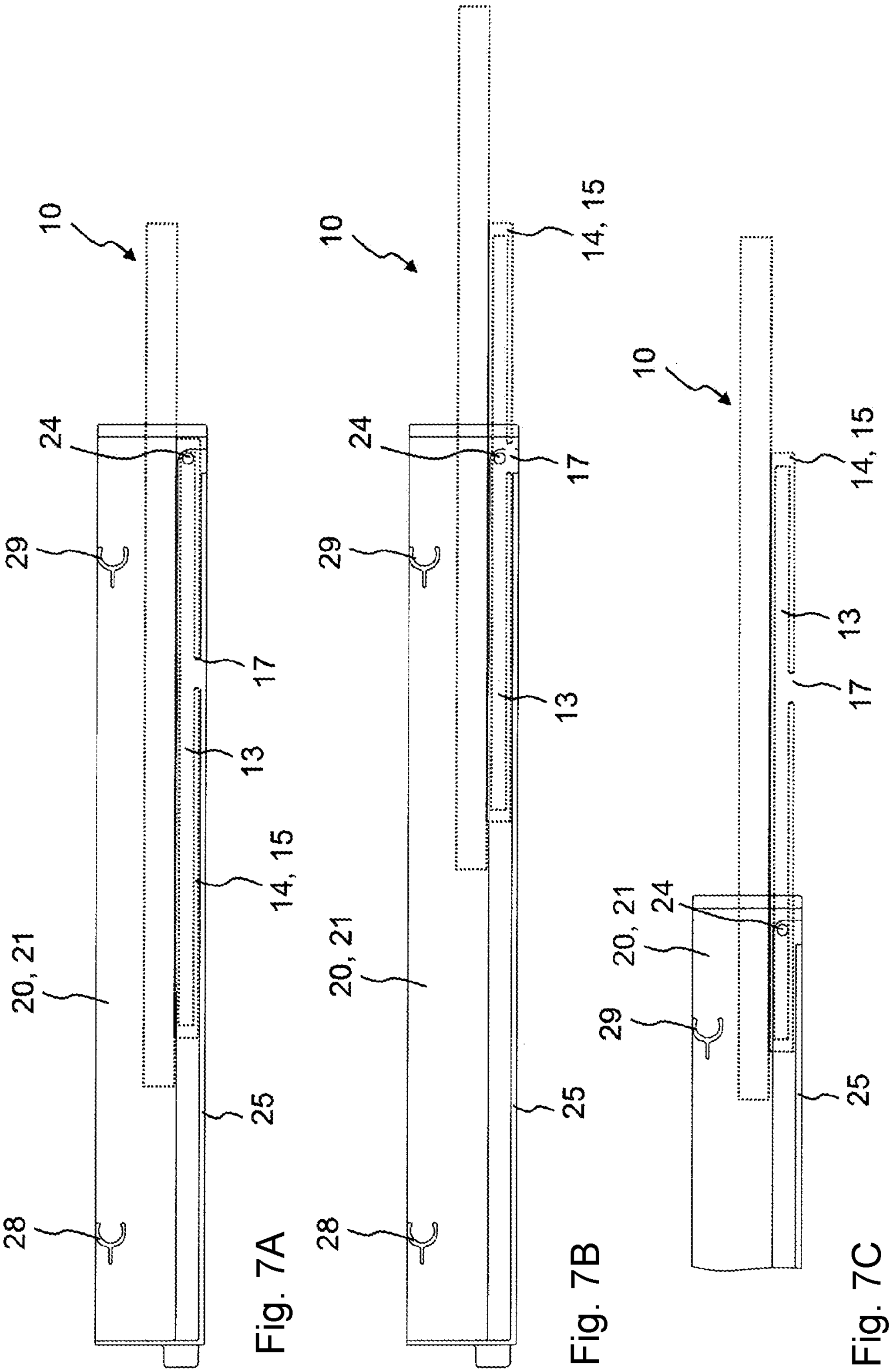
FIGS. 7A, 7B, 7C and 7D are different states of the closure flap, between an open position and a closed position.

In FIG. 7A, the closure flap 10 is in the open position. The engagement device 24 abuts a first closed end of the guide groove 13. A part of the closure flap 10 protrudes from the opening 7 of the receiving space. The largest part of the closure flap 10 is arranged within the receiving space 8. The closure flap 10 rests on the support member 25 of the respective first or second suspension frame 20, 21. In this case, it rests on said support member 25 with its corresponding housing arrangement 14, 15.

In FIG. 7B, the closure flap 10 is moved from the open position into the closed position. The closure flap 10 still has a predominantly horizontal alignment. In the position in FIG. 7B, the engagement device 24 could be removed from the guide groove 13 via the insertion opening 17. For this purpose, the closure flap 10 would have to be raised in this position.

FIG. 7C is a view during a further movement of the closure flap 10 in the direction of the closed position. It can only be tilted minimally because it would otherwise immediately strike the cover arrangement 6 or the first or second support rod 30, 31 on the respective holding device 28, 29. This prevents the closure flap 10 from being folded down unintentionally. The closure flap 10 can be rotated by, in particular, 90° only when the closure flap 10 has been moved into the end position (the engagement device 24 abuts a second closed end of the guide groove 13).

Figure 7D:
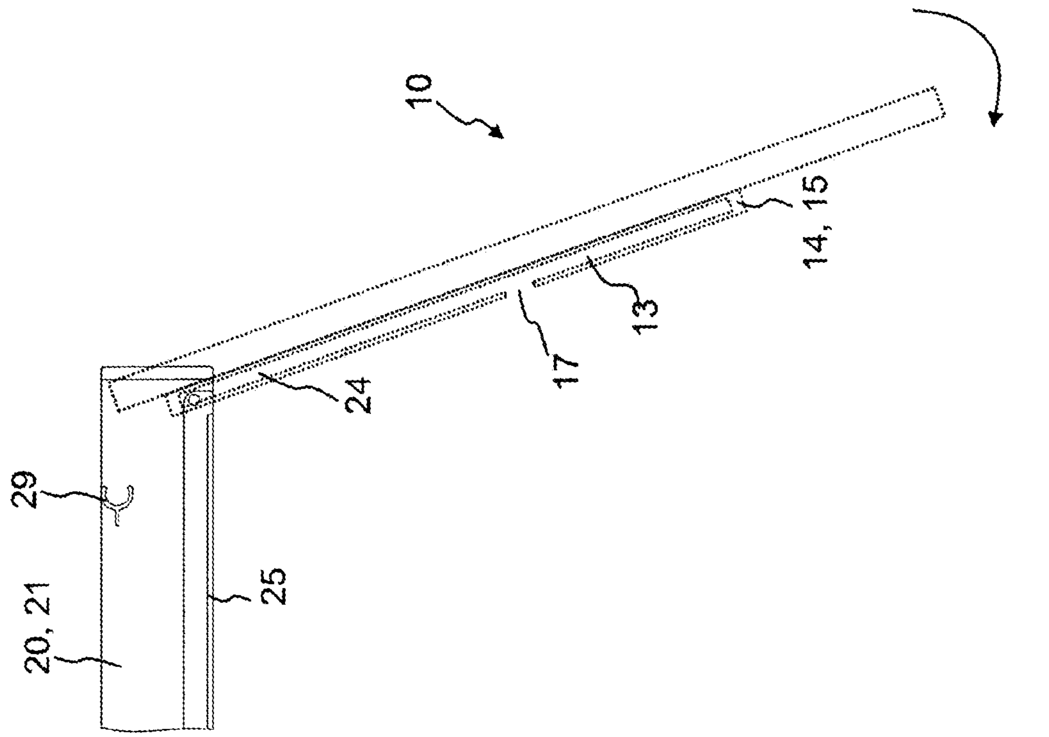

As soon as the closure flap 10 has been moved into the end position and the engagement device 24 abuts a second closed end of the guide groove 13, the closure flap 10 can be rotated. FIG. 7D shows a position of the closure flap 10 in which it has been rotated or tilted further in the direction of the closed position.

Figure 8A:
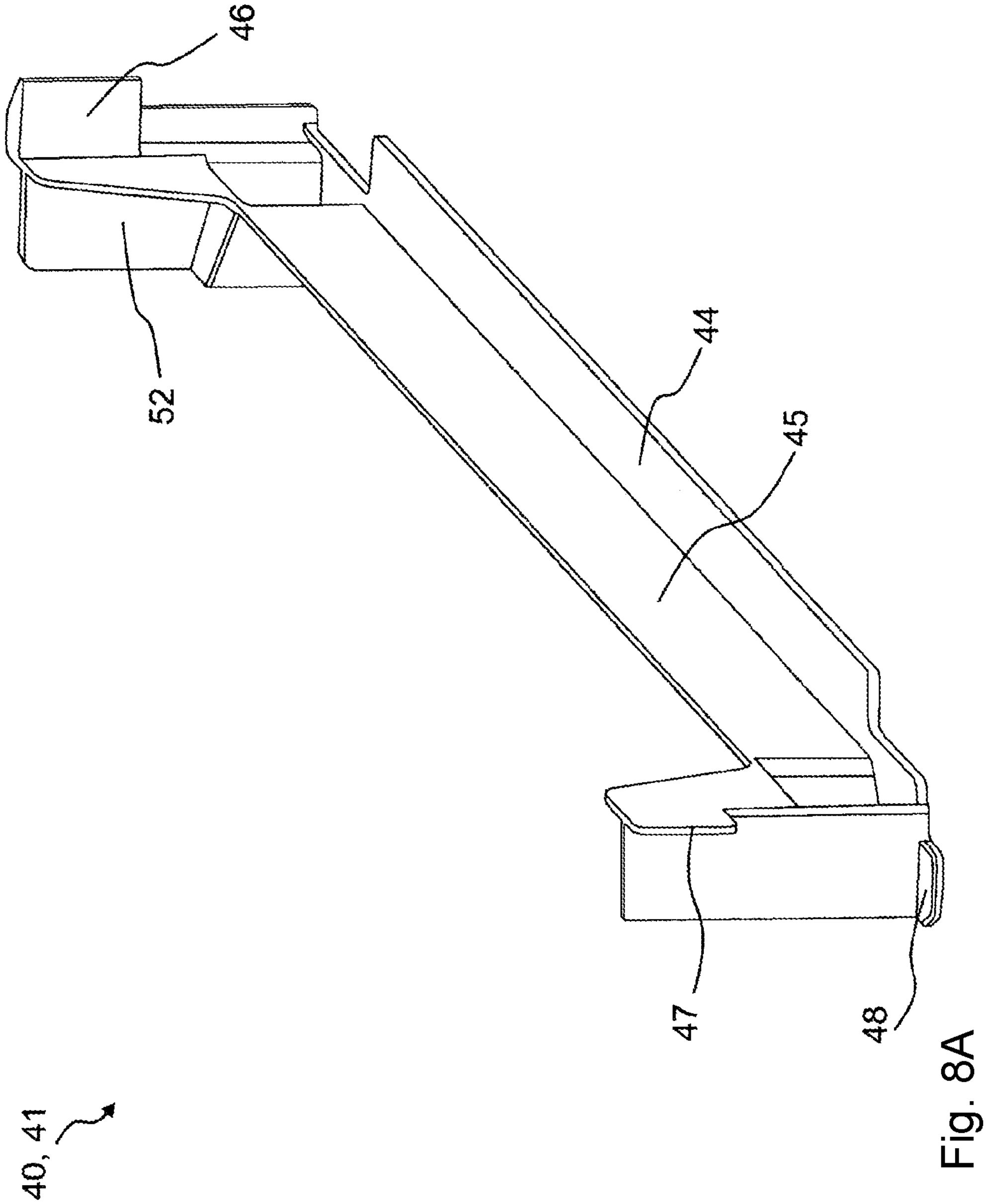
FIGS. 8A and 8B are different embodiments of a door-stop.

In order to prevent the closure flap 10 from swinging into the receiving space 8, a first and a second doorstop 40, 41 are preferably also provided. A first (left) doorstop 40 is described in FIGS. 8A and 8B. It is inserted in the region of the first side wall 2 and the base arrangement 6. A second doorstop 41 is inserted in the region of the second side wall 3 and the base arrangement 6. Both doorstops 40, 41 are identical, but constructed in a mirrored manner. The reference signs of the first doorstop 40 also apply to the second doorstop 41. The first and the second doorstop 40, 41 comprise a stop portion 42 with a flap stop surface 43. This flap stop surface 43 is arranged in the region of the opening 7 of the item of furniture 1. In the closed position, the closure flap 10 can be brought into contact with the respective flap stop surface 43. The first and the second doorstop 40, 41 also comprise a resting surface 44 which is introduced between the first and second side wall 2, 3 and the base arrangement 6. There is also a contact portion 45 which extends from the resting surface 44 in the direction of the cover arrangement 6 (preferably by less than 6 cm, 5 cm, 4 cm but preferably by more than 1 cm) and ends at a distance therefrom. The contact portion 45 is arranged within the receiving space 8 and bears against an inner side 2*b*, 3*b* of the first or second side wall 2, 3.

The stop portion 42 of the first or second doorstop 40, 41 is arranged on the contact portion 45 in the region of the opening 7 and extends in the direction of the receiving space 8. It preferably extends into the receiving space 8 by less than 5 cm, 4 cm, or by less than 3 cm. However, it preferably extends into the receiving space 8 by more than 1 cm.

The first or second doorstop 40, 41 preferably also comprises a front contacting portion 46, wherein, over a partial length of the front end face 2*c*, 3*c* of the first or second side wall 2, 3, the front contacting portion 46 bears against said front end face.

Further preferably, there is also a rear contacting portion 47 which, over a partial length, is arranged on the left or right end face 4*a*, 4*b* of the rear wall 4.

Furthermore, there may also be a rear resting surface 48 that can be introduced in the region between the rear wall 4 and the base wall 5.

In principle, the first or second doorstop 40, 41 could also be integrated in the first or second suspension frame 20, 21. In this case, the flap stop surface 43 would extend from the contact portion 23 into the receiving space 8 and run vertically in the region of the opening 7 in the direction of the base arrangement 5.

The closure flap 10 preferably also comprises a lock device 50 which can switch back and forth between a closed state in which the closure flap 10 cannot be opened in the closed position and an open state in which the closure flap 10 can be opened in the closed position. The lock device 50 comprises a closure rod arrangement 51 (see FIG. 5). In the closed state, the closure rod arrangement 51 can be brought into engagement with a lock stop surface 52 (see FIG. 8A) of the first and second doorstop 40, 41, respectively. In this case, this lock stop surface 52 points in the direction of the rear wall 4.

Figure 8B:
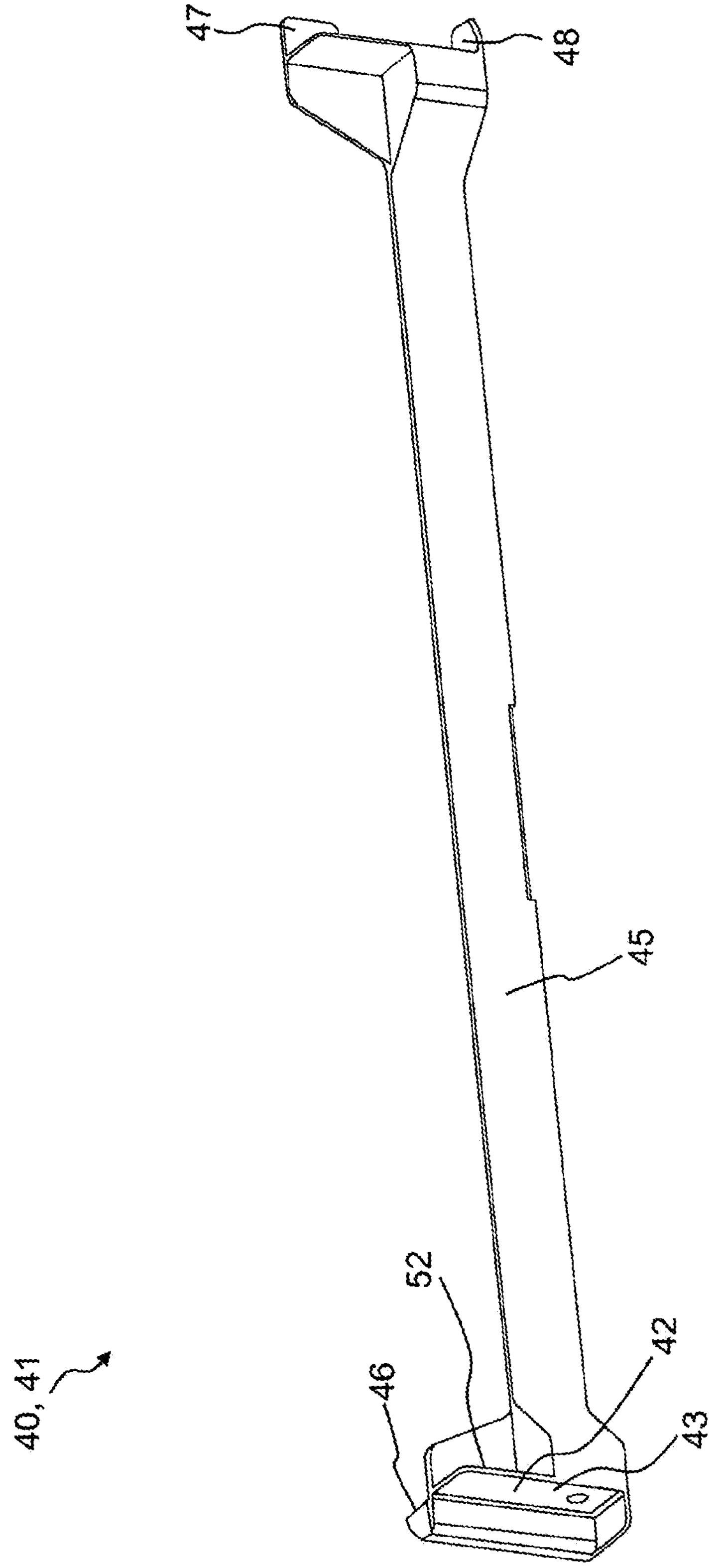

According to FIG. 8B, the lock stop surface 52 of the first and second doorstop 40, 41 is formed by the stop portion 42 of the first and second doorstop 40, 41. It could also be formed by a further stop portion which is arranged closer to the rear wall 4 than the already described stop portion 42 with the flap stop surface 43.

Returning to FIG. 1, it is also shown that the first and second side wall 2, 3 and the rear wall 4 as well as the base arrangement 5 and the cover arrangement 6 are fastened to corresponding vertical columns 60. This is optional. In this embodiment, said columns 60 have a square cross section. The columns 60 are preferably all rotated by 45° with respect to the first or second side wall 2, 3 or the rear wall 4. In the embodiment, each of these columns has 4 corresponding side surfaces.

In this case, one side surface of each column 60 points in the direction of the receiving space 8. In particular, holding elements that are introduced into the corners of the rear wall 4 engage in these side surfaces of the rear columns 60. The further holding surfaces of said holding elements then grip (encompass) the cover arrangement 6 or the base arrangement 5. As a result, the rear wall 4 can be mounted without screws or adhesive.

A holding element 53 in the form of a loop or a handle is also attached to the closure flap 10, so that a user can easily open or close the closure flap 10.

The invention is not restricted to the embodiments described. Within the scope of the invention, all of the described and/or depicted features can be combined with one another in any manner.

In particular, an item of furniture according to the invention may comprise one or more of the following features:

the support member 25 of the first suspension frame 20 is spaced further apart from the cover arrangement 6 than the engagement device 24 of the first suspension frame 20; and/or the support member 25 of the second suspension frame 21 is spaced further apart from the cover arrangement 6 than the engagement device 24 of the second suspension frame 21.

The support member 25 of the first suspension frame 20 is spaced further apart from the opening 7 of the item of furniture 1 than the engagement device 24 of the first suspension frame 20; and/or the support member 25 of the second suspension frame 21 is spaced further apart from the opening 7 of the item of furniture 1 than the engagement device 24 of the second suspension frame 21.

The support member 25 of the first suspension frame 20 comprises a stop portion 26, wherein the stop portion 26 extends from the support member 25 in the direction of the cover arrangement 6, wherein the stop portion 26 of the first suspension frame 20 can be brought into contact with an inner side of the rear wall 4; and/or the support member 25 of the second suspension frame 21 comprises a stop portion 26, wherein the stop portion 26 of the second suspension frame 21 can be brought into contact with an inner side of the rear wall 4.

The support member 25 of the first suspension frame 20 extends over more than 50%, 60% or over more than 70% but over less than 95%, 90%, 85% or over less than 80% of the length of the first suspension frame 20; and/or the support member 25 of the second suspension frame 21 extends over more than 50%, 60% or over more than 70% but over less than 95%, 90%, 85% or over less than 80% of the length of the second suspension frame 21.

The first suspension frame 20 comprises a front contacting portion 27, wherein the front contacting portion 27, over a partial length of a front end face 2*c* of the first side wall 2, bears against the front end face 2*c*; and/or the first suspension frame 20 comprises a rear contacting portion 35, wherein the rear contacting portion 35, over a partial length of a left end face 4*a* of the rear wall 4, bears against said left end face 4*a*; and/or the second suspension frame 21 comprises a front contacting portion 27, wherein the front contacting portion 27, over a partial length of a front end face 3*c* of the second side wall 3, bears against the front end face 3*c*; and/or the second suspension frame 21 comprises a rear contacting portion 35, wherein the rear contacting portion 35, over a partial length of a right end face 4*b* of the rear wall 4, bears against said right end face 4*b*.

The contact portion 23 of the first suspension frame 20 comprises a holding device 28, 29, wherein the holding device 28, 29 comprises a circumferential wall that is continuous at least in portions, extends in the direction of the receiving space 8 and surrounds a holding space, wherein the holding space is open at least in the direction of the second suspension frame 21, and wherein a first end of the support rod 30, 31 is arranged and held in said holding space; and/or the contact portion 23 of the second suspension frame 21 comprises a holding device 28, 29, wherein the holding device 28, 29 comprises a wall that is continuous at least in portions, extends in the direction of the receiving space 8 and surrounds a holding space, wherein the holding space is open at least in the direction of the first suspension frame 20, and wherein a second end of the support rod 30, 31 is arranged and held in said holding space.

The guide groove 13 of the first guide device 11 is arranged in a first end face 10*b* of the closure flap 10; or the guide groove 13 of the first guide device 11 is arranged in a first housing arrangement 14, wherein the first housing arrangement 14 is fastened to an inner side 10*a* of the closure flap 10; and/or the guide groove 13 of the second guide device 12 is arranged in a second end face 10*c* of the closure flap 10; or the guide groove 13 of the second guide device 12 is arranged in a second housing arrangement 15, wherein the second housing arrangement 15 is fastened to an inner side 10*a* of the closure flap 10.

The guide groove 13 of the first guide device 11 runs exclusively along a straight line at least in the region where the engagement device 24 of the first suspension frame 20 moves during a movement of the closure flap 10 from the open position into the closed position; and/or the guide groove 13 of the second guide device 12 runs exclusively along a straight line at least in the region where the engagement device 24 of the second suspension frame 21 moves during a movement of the closure flap 10 from the open position into the closed position.

The guide groove 13 of the first guide device 11 comprises two closed ends 16 which, when the closure flap 10 is in the closed position, point in the direction of the cover arrangement 6 and the base arrangement 5 and in particular serve as a stop and define the open position and the closed position of the closure flap 10; and/or the guide groove 13 of the second guide device 12 comprises two closed ends 16 which, when the closure flap 10 is in the closed position, point in the direction of the cover arrangement 6 and the base arrangement 5 and in particular serve as a stop and define the open position and the closed position of the closure flap 10.

The first guide device 11 has an insertion opening 17 via which the guide groove 13 is accessible, wherein the insertion opening 17 in the open position of the closure flap 10 or shortly before reaching the open position of the closure flap 10 faces in the direction the base arrangement 5, and wherein an engagement device 24 of the first suspension frame 20 can be inserted into the guide groove 13 via the insertion opening 17; and/or the second guide device 12 has an insertion opening 17 via which the guide groove 13 is accessible, wherein the insertion opening 17 in the open position of the closure flap 10 or shortly before reaching the open position of the closure flap 10 faces in the direction the base arrangement 6, and wherein an engagement device 24 of the second suspension frame 21 can be inserted into the guide groove 13 via the insertion opening 17.

The insertion opening 17 of the first guide device 11 and the insertion opening 17 of the second guide device 12 are arranged at different distances from the rear wall 4 in the open position of the closure flap 10.

The invention claimed is:

1. An item of furniture, comprising:

a first and a second side wall, a rear wall, a base arrangement, and a cover arrangement, which delimit a receiving space;

an opening located between the first and the second side wall;

a closure flap movable back and forth between an open position in which the receiving space is accessible from outside the item of furniture via the opening, and a closed position in which the opening is closed by the closure flap, the closure flap including a first and a second guide device; and a first suspension frame and a second suspension frame;

wherein the first suspension frame rests on a substantially horizontally disposed upper end face of the first side wall which points in the direction of the cover arrangement and the second suspension frame rests on a substantially horizontally disposed upper end face of the second side wall which points in a direction of the cover arrangement;

wherein the first guide device is arranged in a region of a first side of the closure flap and is in mechanical contact with the first suspension frame over an entire movement path of the closure flap from the open position into the closed position;

wherein the second guide device is arranged in a region of a second side of the closure flap and is in mechanical contact with the second suspension frame over the entire movement path of the closure flap from the open position into the closed position; and wherein the first suspension frame comprises a support portion which rests on the substantially horizontally disposed upper end face of the first side wall, a contact portion which, proceeding from the support portion, extends in a direction of the base arrangement and ends spaced apart therefrom and within the receiving space bears against an inner side of the first side wall, and an engagement device which is arranged on the contact portion in a region of the opening and extends in a direction of the receiving space and is configured to engage the first guide device of the closure flap, the second suspension frame comprises a support portion which rests on the substantially horizontally disposed upper end face of the second side wall, a contact portion which, proceeding from the support portion, extends in a direction of the base arrangement and ends spaced apart therefrom and within the receiving space bears against an inner side of the second side wall, and an engagement device which is arranged on the contact portion in a region of the opening and extends in a direction of the receiving space and is configured to engage the second guide device of the closure flap.

2. The item of furniture according to claim 1, wherein:

the engagement device of at least one of the first suspension frame and the second suspension frame includes a cylindrical projection or a peg.

3. The item of furniture according to claim 1, wherein:

at least one of the first suspension frame and the second suspension frame comprises a support member which is formed on the contact portion and extends in the direction of the receiving space and is configured to hold the closure flap in the open position in a region of at least one of the first side and the second side of the closure flap.

4. The item of furniture according to claim 1, further comprising:

at least one support rod arranged on the contact portion of at least one of the first suspension frame and the second suspension frame, wherein the at least one support rod extends between the cover arrangement and the closure flap when the closure flap is in the open position.

5. The item of furniture according to claim 1, wherein:

at least one of the first suspension frame and the second suspension frame comprises one piece and comprises plastic.

6. The item of furniture according to claim 1, wherein:

at least one of the first suspension frame and the second suspension frame is mounted in at least one of a screw-free, free of adhesive and press-free manner on the at least one of the first side wall and the second wall and is configured to be removed from the at least one of the first side wall and the second wall without leaving any traces.

7. The item of furniture according to claim 1, wherein:

at least one of the first side wall and the second wall is free of a groove for at least one of guiding the closure flap and fastening the at least one of the first suspension frame and the second suspension frame.

8. The item of furniture according to claim 1, wherein:

the first guide device comprises a guide groove which is open in the open position of the closure flap in a direction of the first side wall and is configured to receive an engagement device of the first suspension frame; and/or the second guide device comprises a guide groove which is open in the open position of the closure flap in a direction of the second side wall and is configured to receive an engagement device of the second suspension frame.

9. The item of furniture according to claim 1, further comprising:

a first doorstop configured to prevent the closure flap from swinging into the receiving space in the closed position; and/or a second doorstop configured to prevent the closure flap from swinging into the receiving space in the closed position.

10. The item of furniture according to claim 1, further comprising:

at least one of a first doorstop and a second doorstop arranged in a region of at least one of the first side wall and the second side wall and the base arrangement and including a stop portion with a flap stop surface in a region of the opening of the item of furniture, wherein the closure flap is configured to be brought into contact with the flap stop surface in the closed position.

11. The item of furniture according to claim 10, wherein:

the at least one of the first doorstop and the second doorstop comprises a resting surface located between the at least one of the first and second side walls and the base arrangement, and a contact portion which, proceeding from the resting surface, extends in the direction of the cover arrangement and ends spaced apart therefrom and within the receiving space bears against an inner side of the at least one of the first and second side walls.

12. The item of furniture according to claim 10, wherein:

the stop portion of the at least one of the first doorstop and the second doorstop is arranged on a contact portion in the region of the opening and extends in the direction of the receiving space.

13. The item of furniture according to claim 10, wherein:

the at least one of the first doorstop and the second doorstop comprises at least one of a front contacting portion bearing against a front end face over a partial length of a front end face of the at least one of the first and second side walls, a rear contacting portion, bearing against at least one of a left end face and a second end face of the rear wall, over a partial length of the at least one of the left end face and the right end face, a rear resting surface that abuts in a region between the rear wall and the base arrangement.

14. The item of furniture according to claim 1, wherein the closure flap comprises a lock device configured to switch back and forth between a closed state in which the closure flap cannot be opened in the closed position and an open state in which the closure flap can be opened in the closed position.

15. The item of furniture according to claim 14, wherein:

the lock device comprises a closure rod arrangement;

the closure rod arrangement configured to be brought into engagement with a lock stop surface of at least one of a first doorstop and a second doorstop in the closed state, wherein the lock stop surface points in the direction of the rear wall.

16. The item of furniture according to claim 1, further comprising:

a first front and a first rear vertically extending column; and a second front and a second rear vertically extending column are provided;

wherein the first side wall is arranged between the first front and the first rear column;

wherein the second side wall is arranged between the second front and the second rear column;

wherein the rear wall is arranged between the first rear and the second rear column; and wherein the opening is formed between the first and the second front column.

17. The item of furniture according to claim 16, wherein:

the first front and the first rear vertically extending column have a square cross section, the second front and the second rear vertically extending column have a square cross section, the first front and the first rear vertically extending column are aligned such that side surfaces of the first front and the first rear vertically extending column are aligned at 45° with regard to side surfaces of the first side wall and the rear wall, and the second front and the second rear vertically extending column are aligned such that side surfaces of the second front and the second rear vertically extending column are aligned at 45° with regard to side surfaces of the second side wall and the rear wall.

18. The item of furniture according to claim 17, wherein:

the first side wall, the second side wall, the base arrangement and the cover cooperate to define corners therebetween;

a holding element is arranged in each corner, which comprises one piece and has two holding surfaces protruding from a respective end face of the two adjacent end faces;

the holding surfaces of each holding element run parallel but in different planes to one another;

a first holding element bears with first holding surface of the first holding element against the side surface of the first rear column which points in the direction of the receiving space and with second holding surface of the first holding element against an outer side of the cover arrangement;

a second holding element bears with first holding surface of the second holding element against the side surface of the first rear column which points in the direction of the receiving space and with second holding surface of the second holding element against an outer side of the base arrangement;

a third holding element bears with first holding surface of the third holding element against the side surface of the second rear column which points in the direction of the receiving space and with second holding surface of the third holding element against an outer side of the cover arrangement; and a fourth holding element bears with first holding surface of the fourth holding element against the side surface of the second rear column which points in the direction of the receiving space and with second holding surface of the fourth holding element against an outer side of the base arrangement.

19. The item of furniture of claim 1, wherein the item of furniture comprises a cabinet.

20. An item of furniture, comprising:

a first side wall, a second side wall, a rear wall, a base arrangement, and a cover arrangement, which delimit a receiving space;

an opening located between the first and the second side walls;

a closure flap movable back and forth between an open position in which the receiving space is accessible from outside of the item of furniture via the position in which the opening is closed by the closure flap, the closure flap including a first and a second guide device; and a first suspension frame and a second suspension frame;

wherein the first suspension frame rests on a substantially horizontally disposed upper end face of the first side wall which points in the direction of the cover arrangement and the second suspension frame rests on a substantially horizontally disposed upper end face of the second side wall which points in a direction of the cover arrangement;

wherein the first guide device is arranged in a region of a first side of the closure flap and is in mechanical contact with the first suspension frame over an entire movement path of the closure flap from the open position into the closed position;

wherein the second guide device is arranged in a region of a second side of the closure flap and is in mechanical contact with the second suspension frame over an entire movement path of the closure flap from the open position into the closed position, and wherein each of the first guide device and the second guide device comprises a guide groove which is open in the open position of the closure flap in a direction of the first side wall and the second side wall, respectively, and is configured to receive an engagement device of the first suspension frame and the second suspension frame, respectively.

* * * * *